Patented Aug. 10, 1943

2,326,350

UNITED STATES PATENT OFFICE 2,326,350

INSECTICIDE

Samuel I. Gertler and Herbert L. J. Haller, Washington, D. C., assignors to Claude R. Wickard as Secretary of Agriculture of the United States of America, and his successors in office No Drawing. Application November 14, 1942, Serial No. 465,569

4 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal compositions containing pyrethrum, and has for its object the provision of an improved composition of this type.

Insecticidal compositions containing pyrethrum are widely used to combat insect pests such as flies, mosquitoes, gnats and the like. Frequently the pyrethrum is employed in a solvent of the hydrocarbon or mineral oil type, such as odorless kerosene, naphtha, etc. While these insecticidal compositions have good toxic properties and are well suited for the control of household insects and the like, they are expensive due to the cost of pyrethrum.

We have found that N-isobutyl-3,4-methylene dioxycinnamamide, also called fagaramide and which is represented by the formula,

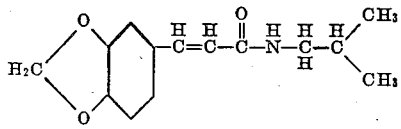

while possessing little or no insecticidal properties in itself, increases the toxicity of pyrethrum to a decidedly advantageous extent. Other alkyl groups, such as methyl, ethyl, propyl, butyl, and so forth, may be substituted in this compound for the isobutyl group attached to the nitrogen atom.

We have found that fagaramide when incorporated with pyrethrum in an odorless kerosene yields an insecticidal composition which has more effect against the ordinary housefly than can be accounted for by either the pyrethrum (pyrethrins) or the fagaramide alone.

Based on these findings, the present invention contemplates an improved insecticidal composition containing pyrethrum and fagaramide. We prefer to use the composition as a spray in a mineral oil in which pyrethrum and fagaramide are mutually soluble. However, our invention is not restricted to such use and the new insecticidal composition may be used in other solvents and in combination with other insecticides such as organic thiocyanates, rotenone, derris, cube and the like. Fagaramide may be prepared synthetically in the laboratory or may be obtained from the plant *Fagara xanthoxyloides*, commonly known as artar root. When obtained from the natural source, it is not necessary to isolate the compound in pure form, but a suitable extract of the plant may be employed.

The efficiency of N-isobutyl-3,4-methylene dioxycinnamamide as a synergist for fly sprays is shown by the following results: A solution containing 0.2 of one percent of this compound in deobase was prepared and gave a kill of three percent after 48 hours. A similar solution, containing in addition, 0.5 milligram of pyrethrins per cubic centimeter, gave a kill of 54 percent after 48 hours. A deobase solution containing 0.5 milligram of pyrethrins per cubic centimeter, gave a kill of 13 percent after 48 hours. Thus, a very small concentration of the compound which in itself is ineffective, gives a pronounced increase in killing power of a dilute pyrethrum solution. This killing power approximates that of the average commercial fly spray, which contains twice the amount of pyrethrins used in the above test. This results in a considerable saving in the use of pyrethrum.

The above example is by illustration only, and the amount and proportion of fagaramide and pyrethrum may be varied over a wide range.

Having thus described our invention, we claim:

1. An insecticidal composition comprising pyrethrum and a compound represented by the formula

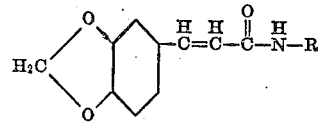

where R is a radical chosen from the group consisting of methyl, ethyl, propyl, butyl and isobutyl.

2. An insecticidal composition comprising N-isobutyl-3,4-methylene dioxycinnamamide and pyrethrum.

3. An insecticidal composition comprising N-isobutyl-3,4-methylene dioxycinnamamide and pyrethrum dissolved in a mutual solvent.

4. An insecticidal composition comprising N-isobutul-3,4-methylene dioxycinnamamide and pyrethrum in a mineral oil base.

SAMUEL I. GERTLER.
HERBERT L. J. HALLER.